US012603483B2

(12) United States Patent
Bindi et al.

(10) Patent No.: US 12,603,483 B2
(45) Date of Patent: Apr. 14, 2026

(54) ABOVE RACK CABLE PULL SYSTEM

(71) Applicant: Oracle International Corporation, Redwood Shores, CA (US)

(72) Inventors: Dario Fabio Bindi, Zürich (CH); Thiago Yokoyama dos Santos, Zürich (CH); Mauricio Valerio, Zürich (CH)

(73) Assignee: Oracle International Corporation, Redwood Shores, CA (US)

( * ) Notice: Subject to any disclaimer, the term of this patent is extended or adjusted under 35 U.S.C. 154(b) by 543 days.

(21) Appl. No.: 17/962,390

(22) Filed: Oct. 7, 2022

(65) Prior Publication Data

US 2024/0120715 A1     Apr. 11, 2024

(51) Int. Cl.
H02G 1/04          (2006.01)
B65G 17/20         (2006.01)

(52) U.S. Cl.
CPC .............. H02G 1/04 (2013.01); B65G 17/20 (2013.01)

(58) Field of Classification Search
CPC ................... B65G 17/20; B65G 17/00; B65G 2201/0276; B65G 47/60–62; B65G 9/00; B65G 9/002; B65G 9/004; H02G 1/02; H02G 1/04; H02G 11/00; H02G 11/006; H02G 2200/30; H02G 3/0456; H02G 7/05; F16G 13/16; F16L 3/1075; F16L 3/1033–1041; F16L 3/10; F16L 3/11; F16L 3/2235; H05K 7/1491
See application file for complete search history.

(56) References Cited

U.S. PATENT DOCUMENTS

| 457,335 | A | 8/1891 | Albert |
| 846,313 | A | 3/1907 | Johnson |
| 847,035 | A | 3/1907 | White et al. |

(Continued)

FOREIGN PATENT DOCUMENTS

| CN | 113824074 A | 12/2021 |
| JP | 2013073411 A | 4/2013 |
| WO | 2011013090 A2 | 2/2011 |

OTHER PUBLICATIONS

"2U Double-Sided Slotted Duct Cable Manager", CableSupply. com, Available Online at: https://cablesupply.com/2u2sidedcm/, Accessed from internet on Feb. 16, 2022, 4 pages.

(Continued)

*Primary Examiner* — Tyrone V Hall, Jr.

(74) *Attorney, Agent, or Firm* — Kilpatrick Townsend & Stockton LLP

(57)          ABSTRACT

Disclosed is a system for positioning fiber and electronics cables within a server room, which includes a wire-pulley system which includes a wire operably coupled to a first pulley wheel and a second pulley wheel. The wire is looped around the first and second pulley wheel such that a point in the wire is laterally movable between the first and second pulley wheels when the first and second pulley wheels are rotated. The system for positioning cables includes a cable carrier which is removably coupled to the point in the wire. The cable carrier includes a first panel, and a second panel hingedly coupled to the first panel. The first panel and second panel each include a plurality of receiving slots, where the receiving slots are configured to removably receive a distal end of various cables.

13 Claims, 6 Drawing Sheets

(56) References Cited

U.S. PATENT DOCUMENTS

| | | | | |
|---|---|---|---|---|
| 2,425,141 | A * | 8/1947 | Bernau | B65G 17/20 |
| | | | | 198/686 |
| 3,051,011 | A * | 8/1962 | Zebley | B65G 39/02 |
| | | | | 198/686 |
| 3,421,187 | A * | 1/1969 | Ryder | F16L 3/2235 |
| | | | | D8/356 |
| 5,564,658 | A | 10/1996 | Rinderer | |
| 6,483,709 | B1 | 11/2002 | Layton | |
| 6,884,942 | B2 | 4/2005 | McGrath et al. | |
| 7,857,670 | B2 | 12/2010 | Mcgrath et al. | |
| 9,104,387 | B1 | 8/2015 | Eichelberg | |
| 9,270,097 | B2 | 2/2016 | Krietzman et al. | |
| 9,948,076 | B1 | 4/2018 | Davey et al. | |
| 10,154,608 | B1 | 12/2018 | Johnson et al. | |
| 10,834,838 | B1 | 11/2020 | Ross et al. | |
| 10,888,013 | B2 | 1/2021 | Jochim et al. | |
| 2004/0226900 | A1 | 11/2004 | Canty et al. | |
| 2005/0185363 | A1 | 8/2005 | Rasmussen et al. | |
| 2006/0029354 | A1 | 2/2006 | Follingstad et al. | |
| 2011/0127476 | A1 | 6/2011 | Ballard | |
| 2011/0147542 | A1 | 6/2011 | Hoek | |
| 2020/0244054 | A1 | 7/2020 | Brandvold | |
| 2022/0255300 | A1 | 8/2022 | Rand et al. | |
| 2023/0369833 | A1 | 11/2023 | Bumstead et al. | |

OTHER PUBLICATIONS

"32623-703 Motive® Double-Sided Vertical Cable Manager", Available Online at: https://www.chatsworth.com/en-us/products/racks-cable-management/cable-management/vertical/motive-double-sided-vertical-cable-manager/32623-703#productDocumentationID, 2022, 1 page.
"4" Wide Vertical Cable Manager WMPV45E", Panduit, Available Online at: https://www.panduit.com/content/dam/panduit/en/products/media/7/67/867/2867/109902867.pdf, 2005, 2 pages.
"45U 6.7" Wide Plastic Dual Sided High Capacity Vertical Cable Management (2) 22.5U Sections", FiberZon, Available Online at: http://www.fiberzon.com/45u-67-wide-plastic-dual-sided-high-capacity-vertical-cable-management-2-225u-sections-p-19761. html, 2022, 1 page.
"Energy Data and Energy for Data Centers—Now and in the Future: Sivacon 8PS LData Busbar Trunking System", Siemens, Available Online at: https://assets.new.siemens.com/siemens/assets/api/uuid:e276a0b7-a825-4a92-9cc0-c488400c734f/sids-b10022-00dbldatasivacon8psenus-144.pdf, 2020, 4 pages.

"High Density Network Rack (HDNR)", Eaton, Available Online at: https://www.eaton.com/au/en-gb/catalog/server-racks-enclosures-airflow-management/high-density-network-rack.html, Accessed from Internet on Feb. 14, 2022, 4 pages.
"Huber+Suhner North American Structured Cabling Solutions", Available Online at: https://literature.hubersuhner.com/Marketsegments/Communication/data-center-nam-2017, pp. 11-28.
"MNPCTech Ethernet Network Cable Combos", MNPCTech.com, Available Online at: https://www.mnpctech.com/products/mnpctech-ethernet-network-cable-combs, 2022, 10 pages.
"NetRunner™ Vertical Cable Managers", Available Online at: https://www.panduit.com/content/dam/panduit/en/products/media/5/95/495/3495/110183495.pdf, Jul. 2020, 2 pages.
"New Busbar Trunking System Enables Higher Energy Efficiency for Data Centers of Tomorrow", Siemens, Available Online at: https://press.siemens.com/global/en/pressrelease/new-busbar-trunking-system-enables-higher-energy-efficiency-data-centers-tomorrow, Accessed from Internet on Feb. 15, 2022, 2 pages.
"Patch Cable Holder for Modular Synthesists", Synthtopia, Available Online at: https://www.synthtopia.com/content/2014/03/16/patch-cable-holder-for-modular-synthesists/, Mar. 16, 2014, 7 pages.
"PATCHBOX: Simplify IT", Available Online at: https://cdn.competec.ch/documents2/3/2/7/199103723/199103723.pdf, 2020, 4 pages.
"PATCHBOX® : The New Standard in Network Rack Cabling", Patchbox, Available Online at: https://patchbox.com/patchbox-cabling-system/, Accessed from Internet on Feb. 14, 2022, 11 pages.
"Professional VR Cable Management for Oculus Quest 2 Link Cable, FANPL Ceiling Suspension Pulley System for Oculus Rift/Rift S/HTC Vive/Vive Pro VR Accessories (6 Pack", Ubuy, Available Online at: https://www.u-buy.jp/en/product/1CEFDWDO-professional-vr-cable-management-for-oculus-quest-2-link-cable-fanpl-ceiling-suspension-pulley-syste, 2021, 3 pages.
"Pulley System Eases Installation of Additional Cables in Cable Tray", Available Online at: https://www.cablinginstall.com/design-install/cabling-installation/article/16468292/pulley-system-eases-installation-of-additional-cables-in-cable-tray, Mar. 1, 1997, 6 pages.
"Quest™ Ring Style Vertical Rack Cable Manager", Available Online at: https://www.cableorganizer.com/categories/racks/cable-management/vertical/quest-ring-vertical-cable-manager/, 2022, 1 page.
U.S. Appl. No. 18/146,952, "Non-Final Office Action", mailed Oct. 8, 2024, 17 pages.
U.S. Appl. No. 18/146,952, "Final Office Action", Jan. 29, 2025, 10 pages.
U.S. Appl. No. 18/146,952, "Corrected Notice of Allowability", Jun. 17, 2025, 2 pages.
U.S. Appl. No. 18/146,952, "Notice of Allowance", May 16, 2025, 11 pages.

* cited by examiner

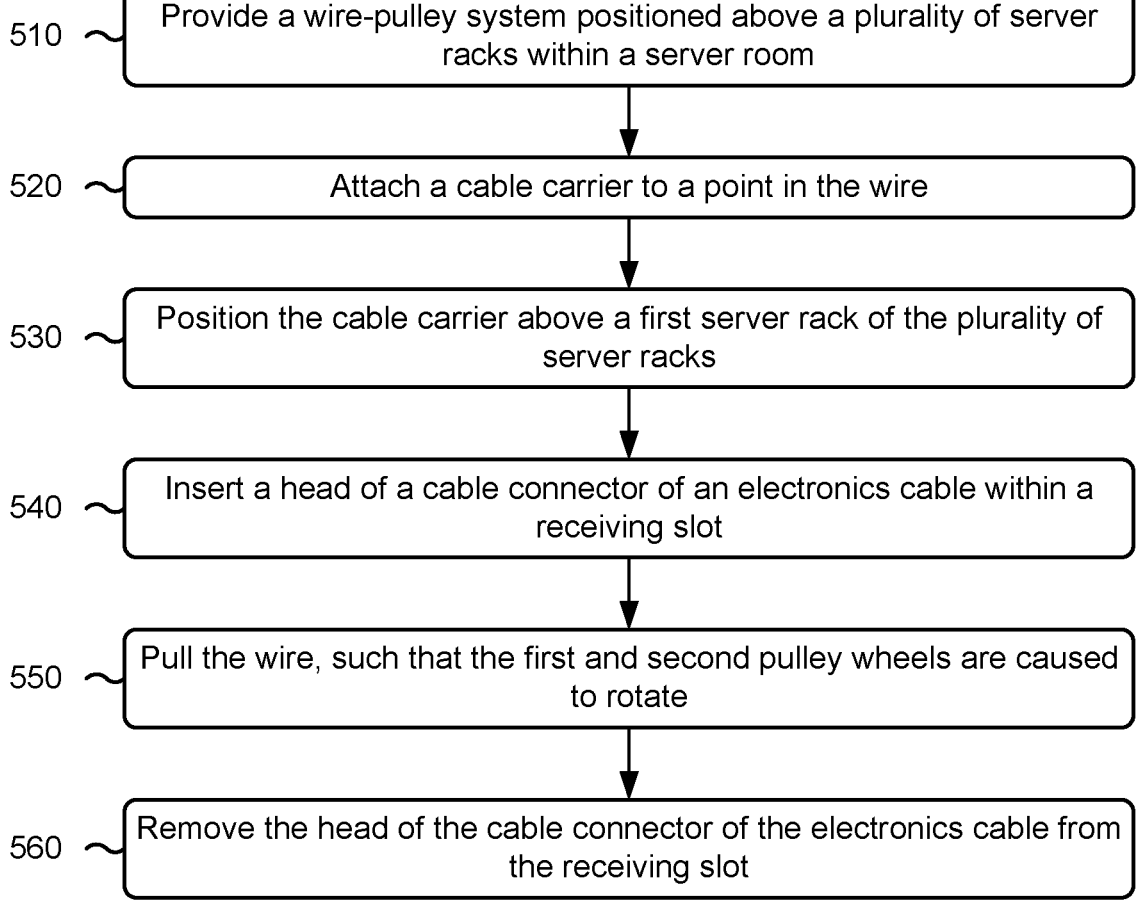

510    Provide a wire-pulley system positioned above a plurality of server racks within a server room 520    Attach a cable carrier to a point in the wire 530    Position the cable carrier above a first server rack of the plurality of server racks 540    Insert a head of a cable connector of an electronics cable within a receiving slot 550    Pull the wire, such that the first and second pulley wheels are caused to rotate 560    Remove the head of the cable connector of the electronics cable from the receiving slot

FIG. 5

ABOVE RACK CABLE PULL SYSTEM

CROSS-REFERENCES TO RELATED APPLICATIONS

This application is related to U.S. Non-Provisional application Ser. No. 17/962,398, filed Oct. 7, 2022, entitled "ABOVE RACK CABLE PULL SYSTEM," now abandoned, the entire contents of which is incorporated herein by reference for all purposes.

BACKGROUND

A server system (e.g., in a data center) often requires the interconnection of a number of large, free-standing server racks to provide the necessary infrastructure to provide suitable data storage and operating performance of the system. To provide the necessary power and data connections between server racks, a large number of power and network cables often span between server racks within a server room. In some configurations, the server room is designed for the cables to be advanced above the server racks, and the server room may include shelves or baskets above the server racks to hold and organize the plurality of cables. In various configurations, the server room may include a network rack which inter-connects with a multitude of server racks, which each provide data storage/processing capabilities.

When installing a new server rack within a server room, it may be necessary to inter-connect the new server rack with other server racks, the network rack, and with power. Each of these connections may require cables which span large distances. For example, the network rack may be positioned across the server room from the new server rack, with a plurality of server racks positioned in between. As such, according to one current approach, a technician may utilize a ladder to incrementally advance the cables to the new server rack. Depending on the distance, the technician may be required to pull the cables as far as they can reach at a given position, and then repeatedly reposition the ladder to subsequently pull the cables farther across the distance between the server racks.

This current approach is time-consuming, particularly in large server rooms where the distance between the server racks requires a large number of iterations of repositioning the ladder. In addition, the cables can be delicate, and increased contact and disruption of the cables can cause damage. Finally, frequent climbing of a ladder increases risk of injury to the technician.

As such, there is a need for a system for positioning various cables within a server room, which increases efficiency and reduces risk of damage to the cables, and reduces risk of injury to the technician.

BRIEF SUMMARY

Modern data centers often include dozens, if not hundreds, of interconnected free-standing server racks, which are designed to provide suitable data storage and operating performance for a server system. As each of the server racks may include a plurality of servers, often a single rack within the data center requires a large number of cables to interconnect with other racks in the server system. For example, a given server rack may require a number of cables (i.e. communication cables, power cables, etc.) to run to the network rack. As the number of server racks increases, both the number of necessary fiber and electronics cables as well as the distances of travel for such cables may expand, creating further complications in managing and efficiently installing a particular server rack.

For example, as a particular server system expands, an additional free-standing server rack may need to be added to meet the requirements of the server system. Such a process includes the installation of the various servers, as well as the process of running cables to their necessary locations to allow the "new" server rack to interconnect with the rest of the system. As such an occurrence is not unusual within a data center, it is beneficial that systems and accompanying methods be utilized which promote the efficiency and reliability of such installation processes.

Many data centers utilize "above-the-rack" cabling methods, where the cables are routed above the server racks, such as in a basket or shelf that holds the cables once they are installed. In current techniques, the installation of a new server, or other circumstance in which a new cable is added above the rack, a technician slowly advances the cable or cables manually from a starting point to the destination. This process (particularly in larger server systems) is slow-going, and may require positioning of a ladder at a number of incremental positions between the starting point and the destination, to allow for further arm's reach to advance the cables. Beyond the time consumption required for repeated advancement of the cables, such a process carries additional risk in damaging the network cables with repeated manipulation of the cables. Furthermore, frequent scaling and descaling of the ladder presents a safety risk to the technician that they may fall or otherwise become injured.

The systems and devices described herein, and the accompanying methods, provide an improved system and method to advance fiber and electronics cable positioning, such as for installation in a server rack. In particular, the disclosure allows for a technician to minimize the number of placements of a ladder in order to advance the electronic cables. According to various implementations, the above rack cable pull system herein may provide an improved system for positioning cables within a server room. Such a system may allow for the technician to connect the cables with the system at a starting position, and advance the cables all the way to the destination at once, rather than through incremental manual advancements. Such an approach reduces likelihood of injury to the technician in repeated ladder usage, damage to the cables from being repeatedly manipulated by the technician, and increased efficiency in advancing the cables.

In one aspect, the system for positioning cables within a server room may include a wire-pulley system, which may include a wire operably attached to a first pulley wheel and a second pulley wheel. The wire may be looped around the first and second pulley wheels, such that a particular point in the wire is laterally movable between the pulley wheels when the pulley wheels are rotated. In various implementations, the pulley wheels may be positioned such that the wire spans a distance between various server racks, or across a server room. Preferably, the wire-pulley system is positioned above the server racks.

In one aspect, the system for positioning cables may include a cable carrier, which may be removably attached or attachable to the wire-pulley system. For example, the cable carrier may attach at a fixed point along the wire such that lateral movement of the wire between the pulleys laterally advances the cable carrier.

The cable carrier may include a first panel and a second panel hingedly coupled with the first panel. As such, the cable carrier may be adjustable between an opened configuration and a closed configuration by use of the hinged coupling. In some aspects, the cable carrier may be hingedly moved like a book cover or clam shell, such that the first panel and second panel are planar with one another in an opened position, and rotatable to a closed position where top surfaces of the first and second panel contact one another.

The first and second panels of the cable carrier may each include a plurality of receiving slots, which are each dimensioned and positioned to removably receive a cable connector (e.g. a "plug") at the distal end of a given cable. For example, when a number of network cables are being moved, such as for installation of a new server rack, each of the connectors at the end of the network cables may be attached to given receiving slots, such that the cable carrier is "loaded" and capable of securing the cable connectors within the cable carrier.

To allow for versatility of the cable carrier to removably secure a number of different cable connector types, the receiving slots may have sidewalls with a tapered structure such that they include two, three, four, or more widths, such that each of the widths is designed to accommodate a sizing of a particular cable connector.

The receiving slots may include a number of protrusions which act to frictionally engage a cable connector when inserted within the receiving slot. For example, each of the widths of the tapered sidewalls may include a protrusion, a pair of protrusions (positioned on opposite sidewalls), or a plurality of protrusions to provide frictional engagement with a particular cable connector.

In one aspect, the first and second panels of the cable carrier may enclose around a given portion of the wire, such that when the cable carrier is in the closed configuration, the wire is frictionally engaged between the upper surfaces of the panels to secure the cable carrier to the wire-pulley system. In other aspects, the cable carrier may include a variety of attachment mechanisms, such as clips, hooks, strings, hook-loop faster straps, or other suitable means to removably attach the cable carrier to a portion of the wire of the wire-pulley system.

In another aspect, a method for positioning copper or fiber cables within a server room includes providing the wire-pulley system positioned above a plurality of server racks within a server room. The wire-pulley system may include a wire operably coupled to a first pulley wheel and a second pulley wheel, where the wire may be looped around the first and second pulley wheels.

In some aspects, the method may include attaching a cable carrier to a point in the wire. The cable carrier may include a first panel, and a second panel hingedly coupled to the first panel. Each of the panels may include a plurality of receiving slots that may have a width corresponding to a width of a head of an network cable.

In some aspects, the method may include positioning the cable carrier above a first server rack of the plurality of server racks. In some aspects, the method may include inserting a head of a cable connector of the network cables. For example, the method may include inserting heads of multiple cable connectors of multiple network cables. In some aspects, the method may include pulling the wire, such that the first and second pulley wheels are caused to rotate, whereby the cable carrier is moved laterally from above the first server rack to above a second server rack of the plurality of server racks. For example, the second server rack may be positioned away from the first server rack, such that a number of other server racks are positioned therebetween. In some aspects, the method may include removing the head of the cable connector of the network cable from the receiving slot.

Implementations of the disclosed techniques and hardware covered by this disclosure are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to the entire specification of this disclosure, all drawings, and each claim.

BRIEF DESCRIPTION OF THE DRAWINGS

FIG. 5 illustrates a flowchart of an exemplary process of positioning cables within a server room according to various implementations of the present technology.

DETAILED DESCRIPTION OF THE DISCLOSURE

Implementations of the present disclosure are related to devices, systems for an above rack cable system having a cable carrier, and methods of use of the same.

Figure 1A:
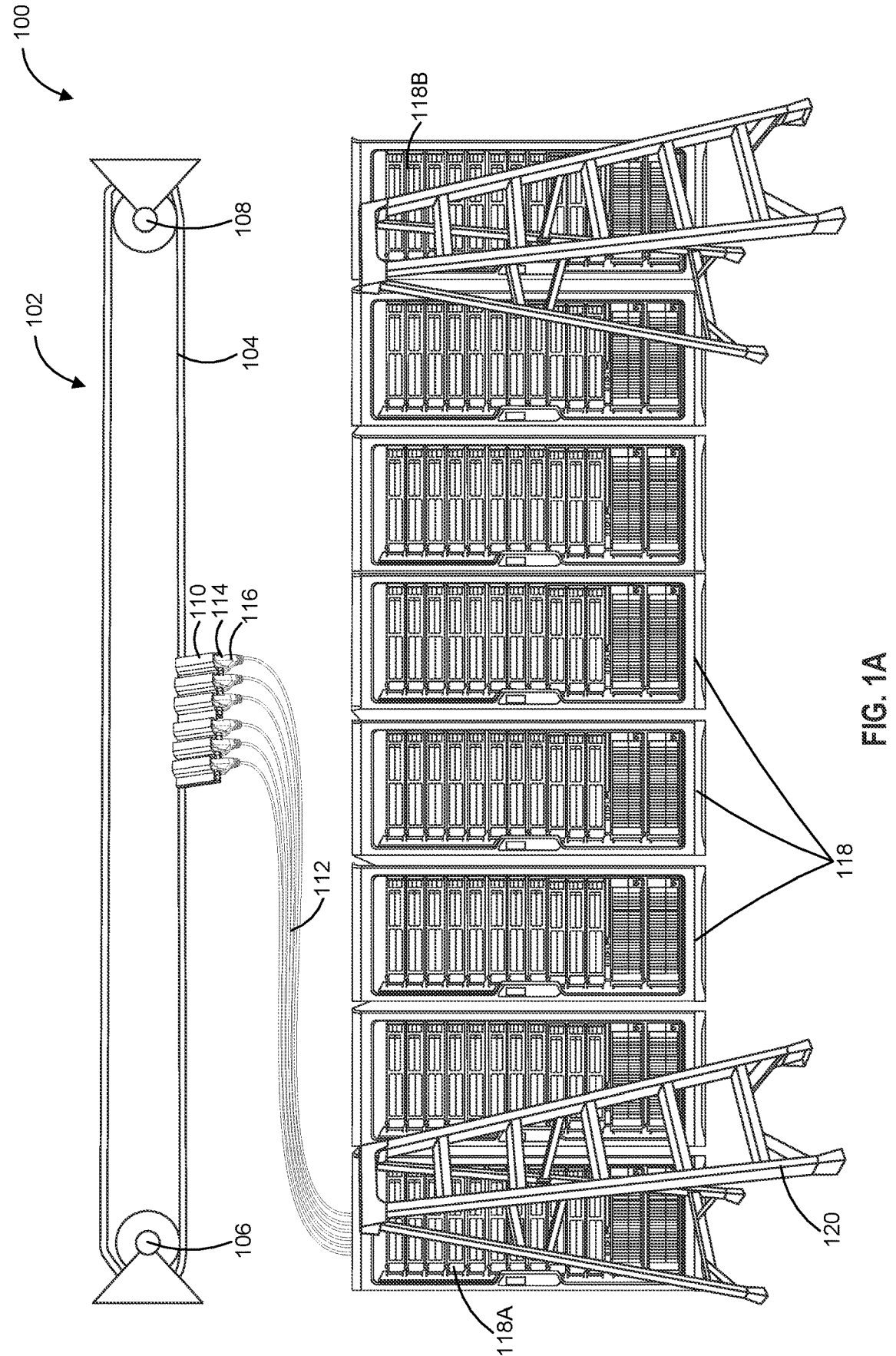
FIG. 1A illustrates a front view of an exemplary above rack pull system according to implementations of the present technology.
Figure 1B:
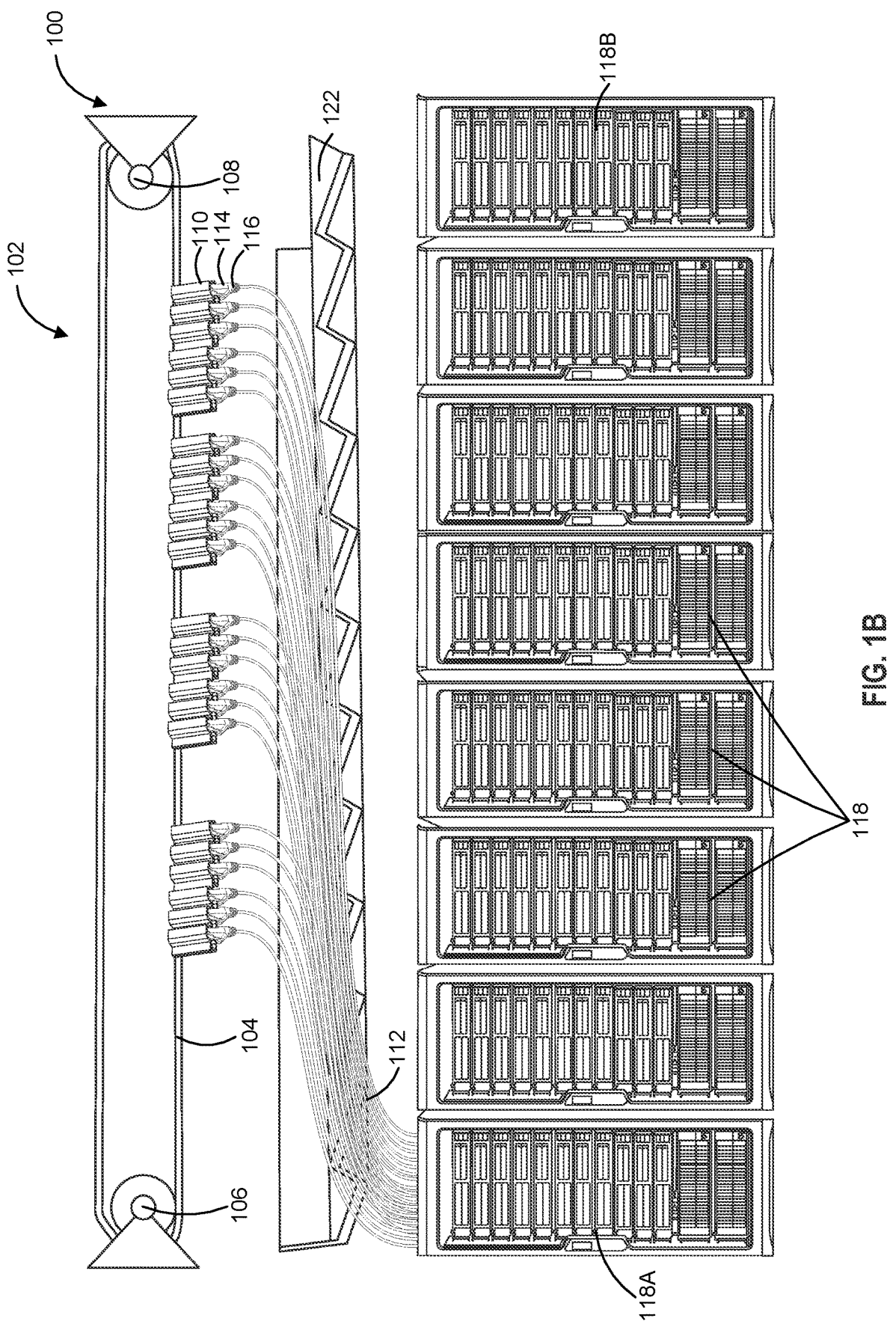
FIG. 1B illustrates a secondary front view of the above rack pull system of FIG. 1A, illustrating lateral movement of the cable carrier.

Referring now to the drawings, in which like reference numerals represent like parts throughout the several views, FIGS. 1A-1B illustrate aspects of a system 100 for positioning copper or fiber cables within a server room according to various aspects of the present disclosure. The system 100 may include a wire-pulley system 102, which may include a wire 104, a first pulley 106, and a second pulley 108. The wire 104 may be looped around the first pulley 106 and second pulley 108, such as illustrated, such that a point (or portion) of the wire is laterally movable between the first pulley 106 and the second pulley 108, such as when the first pulley 106 and second pulley 108 are rotated. Such rotation may occur for example, by pulling on the wire 104, or by rotation of one of the first pulley 106 and the second pulley 108. The wire-pulley system 102 may be positioned above a plurality of server racks 118 of the server room. For example, the first pulley 106 and second pulley 108 may be mounted or otherwise attached to walls within the server room, such as at opposite sides of the server room, such that the wire 104 spans a distance above the server racks 118.

According to various implementations, the system 100 may include a cable carrier 110 (shown in greater detail in FIG. 2), which may be removably coupled to a point (or portion) of the wire 104. The cable carrier 110 may be designed such that one or more network cables 112 may be removably attached or received by the cable carrier 110. For example, each of the one or more network cables 112 may include a cable connector 114 at a distal end of an network cable 112, which may include a cable head 116. Such features may be referred to as a plug, or connector for ultimately plugging the cable 112 into an electronic device such as a server (e.g. a server within a server rack). While FIGS. 1A-1B show the cable connector 114 visible and angled with respect to the cable carrier 110, such illustrations are provided for the purposes of visualizing the cable connector 114, and it should be appreciated that the cable connector 114 of the one or more cables may be fully inserted within the cable carrier 110, as discussed at length below.

In various implementations, the server room may include a plurality of server racks 118, which may each house a plurality of servers. For example, the plurality of server racks 118 may include a first server rack 118A, which for purposes of illustration may be the server rack 118 in which the one or more copper or fiber cables 112 are attached (plugged in). For example the first server rack 118A may be a network server.

A technician may desire (or a server layout may require) interconnection between the first server rack 118A and one of the various other plurality of server racks 118. For example, a technician may require interconnection between the first server rack 118A and a second server rack 118B via the one or more network cables 112. As such, the cable connector 114 of the one or more network cables 112 may be removably attached or received by the cable carrier 110. According to various implementations, the cable connector 114 of one or more various cables 112 may be removably attached to the cable carrier 110 prior to the cable carrier 110 being attached to the wire 104 of the wire-pulley system 102. In such configurations, the cable connector 114 of the one or more cables 112 may be removably attached to the cable carrier 110 proximal to the first server rack 118A, and subsequently attached to the wire 104, such as at a point above or nearly above the first server rack 118A. For example, a ladder 120 may be positioned near the first server rack 118A to allow a technician to reach the wire 104 for attachment of the cable carrier 110.

According to various implementations, the cable carrier 110 may be attached to the wire 104 of the wire-pulley system 102, and the cable connector 114 of the one or more cables 112 may be subsequently removably attached or received by the cable carrier 110. For example, a technician may utilize the ladder 120 to attach the cable connector 114 to the cable carrier 110 at a position above or nearly above the first server rack 118A. Exemplary attachment of the cable carrier 110 to the wire 104 is described in greater detail with reference to FIG. 4.

After the cable connectors 114 have been received by the cable carrier 110, the cable carrier 110 may be advanced laterally from a position above or nearly above the first server rack 118A to a position near the intended destination of the one or more cables 112. For example, as illustrated, the cable carrier 110 may be advanced laterally to a position above or nearly above the second server rack 118B. FIG. 1B illustrates a progression over time of the motion of the cable carrier 110 being advanced between the first server rack 118A and the second server rack 118B.

Once the cable carrier 110 has been advanced to its intended destination, such as above the second server rack 118B, the cable connector 114 of the one or more cables 112 may be removed from the cable carrier 110. As discussed with attaching the cable connector 114 to the cable carrier 110, the cable connector 114 may be removed from the cable carrier 110 while the cable carrier 110 remains attached to the wire 104 of the wire-pulley system 102. Alternatively, the cable carrier 110 may be removed from the wire 104, and the cable connectors 114 may be subsequently removed from the cable carrier 110.

As illustrated in FIG. 1B, the sever room may further include a basket 122, or a shelf or other structure which retains the one or more cables 112 subsequent to their installation. According to various implementations, the basket 122 may be positioned below the wire-pulley system 102, and may retain the one or more cables 112 after their removal from the cable carrier 110.

Figure 2:
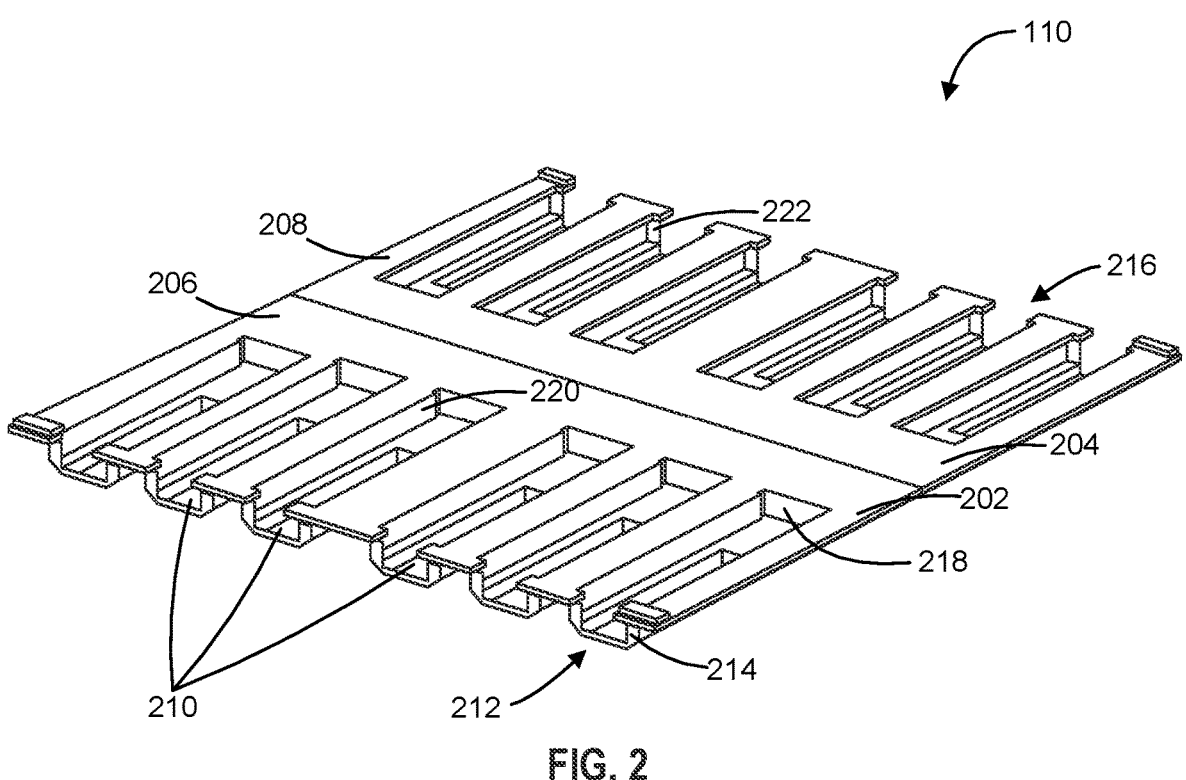
FIG. 2 illustrates a front perspective view of an exemplary cable carrier according to implementations of the present technology.

FIG. 2 illustrates a front perspective view of an exemplary cable carrier 110 according to implementations of the present technology. The cable carrier 110 may include a first panel 202 and a second panel 204 hingedly connected to the first panel 202. As such, the cable carrier 110 may be positionable to an opened configuration (as shown in FIG. 2), where the cable carrier 110 forms a substantially linear shape, where the first panel 202 and second panel 204 are substantially planar. The cable carrier 110 may be moveable to a closed configuration wherein the top surface 206 of the first panel 202 and the top surface 208 of the second panel 204 are hinged towards one another, and may hinge into contact or nearly into contact.

The first panel 202 and/or the second panel 204 may include a plurality of receiving slots 210. For example, the first panel 202 may include 1, 2, 4, 6, 8, 10 or more receiving slots 210, or any number therebetween. The second panel 204 may include 1, 2, 4, 6, 8, 10 or more receiving slots 210, or any number therebetween, and may include the same number of receiving slots as the first panel 202 or a different number than the first panel 202.

The receiving slots 210 may be each be configured to removably receive a cable connector 114, such as the distal end of an electronics or fiber cable 112. For example, the receiving slots 210 may include a distal opening 212 at a distal edge 214, 216 of the respective first panel 202 or the second panel 204. Furthermore, the receiving slots 210 may include a closed proximal end 218. The receiving slots 210 may include sidewalls 220 defining one or more widths, as discussed with regards to FIG. 3, below. The receiving slots 210 may include an open top at the top surface 206, 208 of the respective first panel 202 and second panel 204.

The receiving slots 210 may be configured such that a cable connector 114 may be positioned such that a width of the cable connector 114 corresponds with the width defined by the sidewalls 220 of the receiving slot 210. As such, the cable connector 114 may be positioned within the receiving slot 210, and the cable may extend outwardly through the distal opening 212 of the receiving slot 210. The receiving slots 210 may further include an outer ledge 222 at the distal opening 212 of the receiving slot 210. such an outer ledge 222 may prevent the cable connector 114 of the cable 112 from being able to pass through the distal opening 212 of the receiving slot 210.

In a closed configuration, where the top surface 206 of the first panel 202 is in contact, or nearly in contact, with the top surface 208 of the second panel 204, receiving slots 210 of the first panel 202 and the second panel 204 may align such that the sidewalls 220 of paired receiving slots 210 are aligned. In such a configuration, the enclosure of the paired receiving slots 210 may prevent the cable connectors 114 enclosed within the paired receiving slots 210 from exiting the opening in the respective top surfaces 206, 208. In combination with the outer ledge 222 preventing the cable connectors 114 from escaping through the distal opening 212, the cable connectors 114 may be fully secured within the paired receiving slots.

While not shown in FIG. 2, the cable carrier 110 may further include attachment mechanisms for removably attaching the cable carrier 110 to the wire 104 of the wire-pulley system 102. These attachment mechanisms may include straps, hooks, loops, hook-loop fasteners, clips, or other similar means, as will be appreciated by one skilled in the art. Such attachment mechanisms may be included on a bottom surface of the first panel 202, the second panel 204, or both the first and second panel (such as spanning between the first and second panel). Such placement may allow for the cable carrier 110 to be attached to the wire-pulley system 102 when in a closed configuration, without the attachment mechanisms interfering with the closing of the cable carrier 110.

According to various implementations, the cable carrier 210 may further be designed such that the wire 104 of the wire-pulley system 102 may be enclosed between the first panel 202 and the second panel 204 in the closed configuration, such that the wire 104 is frictionally contained between the first panel 202 and second panel 204, such as to removably attach the cable carrier 110 to a portion of the wire 104. Such features are discussed in further detail in reference to FIG. 4.

Figure 3:
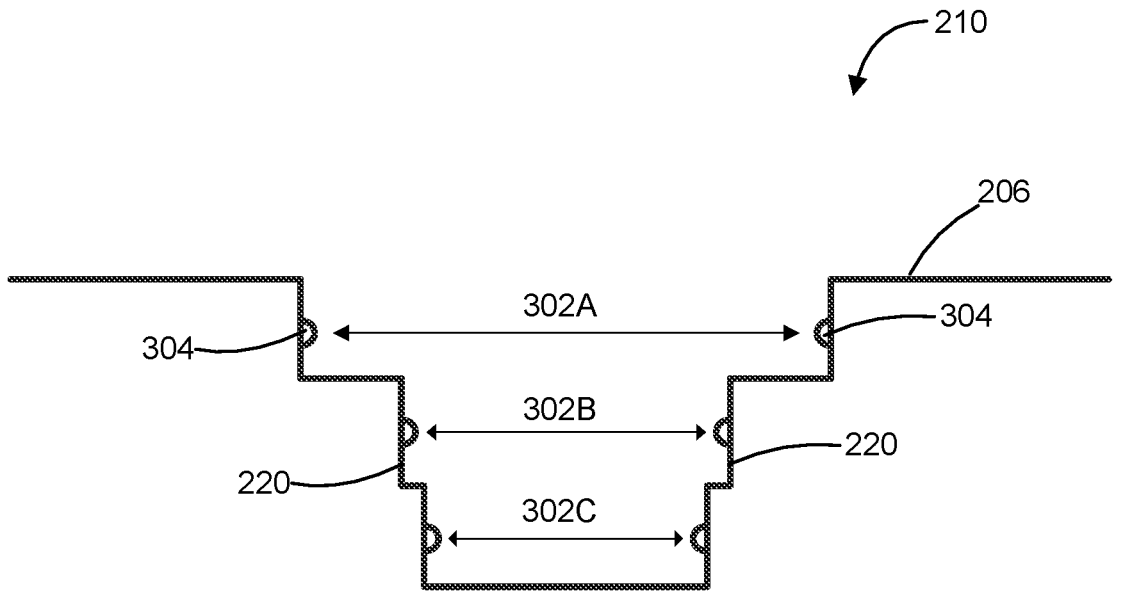
FIG. 3 illustrates a side view schematic of an exemplary receiving slot of a cable carrier according to implementations of the present technology.

FIG. 3 illustrates a side view schematic of an exemplary receiving slot 210 of a cable carrier 110 according to various implementations of the present technology. As shown, the sidewalls 220 may be tapered to define a plurality of widths 302. For example, the sidewalls 220 may define a first width 302A, a second width 302B, and a third width 302C. Any number of widths 302 may be selected, including a fourth width and a fifth width. Each of the widths 302 may correspond with a width of a particular type of cable connector 114. For example the cable connectors 114 may include a QSFP cable connector, a RJ45 cable connector, a SFP cable connector, and other similar cable connectors as appreciated by one skilled in the art. The widths 302 may be incrementally decreased, with the largest width 302A being positioned closest to the top surface 206, 208 of the respective first panel 202 and second panel 204. As such, the cable connector 114 may be pushed downwardly until it reaches a particular width 302 which is compatible with the width of the given cable connector 114.

The sidewalls 220 may include protrusions 304 which extend outwardly into the width 302 of the receiving slot 210. For example, a particular width 302A, 302B, 302C may include a single protrusion 304 on each sidewall 220, or may include a plurality of protrusions on each sidewall 220 at each width 302. The protrusions 304 may provide additional friction between the cable connector 114 and the sidewalls 220 to further retain the cable connector 114 within the receiving slot 210.

As shown in FIG. 2, each width 302 of the receiving slot 210 may have a different depth between the closed proximal end 218 and the distal opening 212. This depth may correspond with a particular cable connector length, such that the cable connector 114 is prevented from axial movement between the distal edge 214 and the closed proximal end 218 when positioned within the receiving slot 210.

Figure 4:
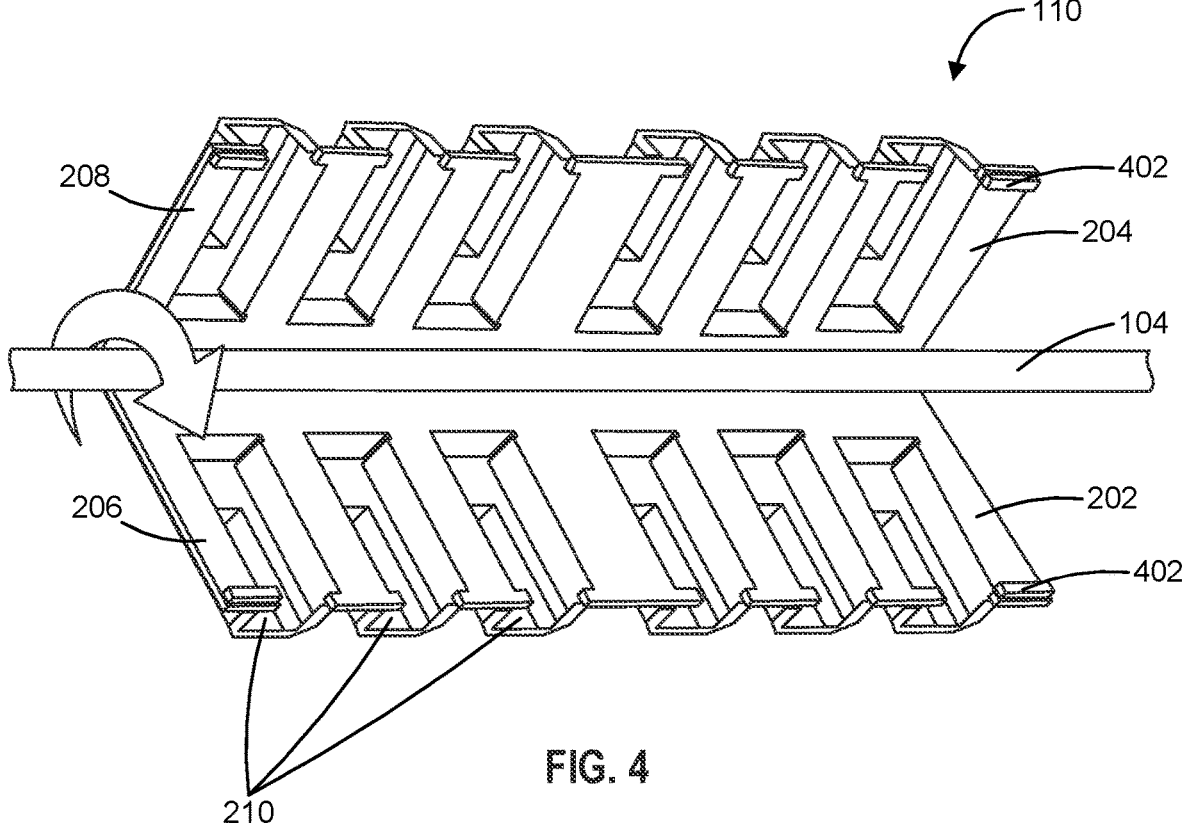
FIG. 4 illustrates a side view of an exemplary process of attaching a cable carrier with a wire of the above rack pull system according to implementations of the present technology.

FIG. 4 illustrates a side view of an exemplary process of attaching the cable carrier 110 with a wire 104 of the wire-pulley system 102. As discussed previously, the cable carrier 110 may be hingedly closed to a closed configuration, where the top surface 206 of the first panel 202 and the top surface 208 of the second panel are brought towards each other, such that the top surfaces 206, 208 are in contact or nearly in contact. For example, the cable carrier 110 may include a plurality of bumpers 402 positioned on one or both of the top surface 206 of the first panel 202 or the top surface 208 of the second panel 204. Oppositely opposed bumpers 402 may contact one another when the cable carrier 110 is in a closed configuration. Such bumpers 402 may provide addition clearance between cable connectors 114 in opposite receiving slots 210, such that the cable connectors 114 do not press against one another when the cable carrier 110 is in the closed configuration. In particular, the bumpers 402 may prevent cable connectors 114 positioned in the first width 302A from contacting one another in the closed configuration, as these cable connectors 114 are positioned most proximate to the top surfaces 206, 208 of the first and second panel 204. Additionally, in some examples, the bumpers 402 implement a closing mechanism, e.g., a "click shut." For example, the first panel 202 may have a "male" increased elevation, while the second panel 204 may have a "female" decreased elevation (404 not illustrated in FIG. 4). Additional clearance between cable connectors is given as outlined, but one aspect for the elevation of bumpers 402/404 is to avoid collision from panels 202 and 204 while in motion.

In various implementations, the cable carrier 110 may be brought into the closed configuration with the wire 104 positioned between the top surface 206 of the first panel 202 and the top surface 208 of the second panel 204. The frictional engagement between the top surfaces 206, 208 may retain the wire 104 within the cable carrier 110, such that the cable carrier 110 is removably secured to a portion (or point) on the wire 104. While not illustrated, the cable carrier 110 may include a channel in one or both of the first panel 202 or the second panel 204 to provide space for the wire 104 to be positioned between the first and second panels 202, 204 when in the closed configuration.

While FIG. 4 is illustrated without cables 112, and specifically without cable connectors 114 within the receiving slots 210, it should be appreciated that the cable carrier 110 may be moved from the opened to closed configuration with or without the presence of cable connectors 114 within the receiving slots 210. According to various implementations, the cable connectors 114 may be positioned within the receiving slots 210 prior to positioning the cable carrier 110 in a closed configuration with the wire 104 retained in between the first panel 202 and the second panel 204.

FIG. 5 is a flowchart of an exemplary process 500 for positioning various cables (e.g. fiber and electronics cables 112) within a server room. In some implementations, one or more of the process blocks of FIG. 5 may be performed manually, such as by an operator, user, technician, or the like. This process is illustrated as a logical flow diagram, each operation of which can be implemented manually, in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The orders in which the operations are described are not intended to be construed as a limitation, and any number of the described operations can be combined in any order and/or in parallel to implement the processes or the method.

At block 510, the process 500 may include providing a wire-pulley system (e.g. wire pulley system 102) positioned above a plurality of server racks (e.g. server racks 118) within a server room. The wire-pulley system may include a wire (e.g. wire 104) operably coupled to a first pulley wheel (e.g. pulley wheel 106) and a second pulley wheel (e.g. pulley wheel 108). The wire may be looped around the first and second pulley wheels, such that a point in the wire is capable of lateral movement as the first and second pulley wheels are rotated.

At block 520, the process 500 may include attaching a cable carrier (e.g. cable carrier 110) to a point in the wire. The cable carrier may include a first panel (e.g. first panel 202) and a second panel (e.g. second panel 204), where the second panel may be hingedly coupled to the first panel. The first panel and/or the second panel may include a plurality of receiving slots (e.g. receiving slots 210). Attaching the cable carrier may include positioning the cable carrier above the point in the wire in an opened configuration, where in the opened configuration the first panel and second panel may be substantially planar, such that the cable carrier forms a substantially linear shape. Attaching the cable carrier may include closing the cable carrier to a closed configuration, such that the first panel and the second panel are hingedly moved with respect to each other such that a top surface (e.g. top surface 206) of the first panel and a top surface (e.g. top surface 208) of the second panel contact one another. Attaching the cable carrier may include maintaining the wire in between the first and second panels of the cable carrier such that the wire may be frictionally engaged by the top surfaces of the first and second panels in the closed configuration, thereby attaching the cable carrier to the wire.

At block 530, the process 500 may include positioning the cable carrier above the first server rack (e.g. first server rack 118A) of the plurality of server racks. Positioning the cable carrier above the first server rack may occur prior to or subsequently to inserting a head of a cable connector of an network cable.

At block 540, the process 500 may include inserting a head of a cable connector (e.g. cable connector 114) of an network cable (e.g. electronics or fiber cable 112) within a receiving slot of the plurality of receiving slots. The receiving slots may have a width (e.g. width 302) corresponding to a width of the head of the various cables. Inserting the head of the cable connector may include inserting the head through an open top of the receiving slot defined in a top surface of the first panel or second panel, such that the head is positioned within the receiving slot and the cable extends outwardly through an open distal end (e.g. distal opening 212) of the receiving slot. Inserting the head of the cable connector may occur prior to attaching the cable carrier to the point in the wire. Alternatively, inserting the head of the cable connector may occur subsequently to attaching the cable carrier to the point in the wire. Inserting a head of a cable connector may include pushing the head into the receiving slot to overcome friction provided by one or more protrusions (e.g. protrusions 304) such that the protrusions frictionally engage sides of the head of the cable to retain the cable within the receiving slot. The receiving slots may have tapered sidewalls to define a plurality of widths (e.g. widths 302A, 302B, 302C) such that each of the widths may conform with a given width of a different type of cable connector.

At block 550, the process 500 may include pulling the wire, such that the first and second pulley wheels are caused to rotate. Such pulling may cause the cable carrier to move laterally from above the first server rack to above a second server rack (e.g. second server rack 118B). Pulling the wire may be performed by a technician, and may include the technician pulling the wire while positioned near the first server rack or near the second server rack. Pulling the wire may be performed by a technician climbing a ladder, or otherwise elevating themselves, to be positioned proximally to the first server rack or the second server rack.

At block 560, the process 500 may include removing the head of the cable connector of the cable from the receiving slot. Removing the head may include overcoming friction provided between the cable connector and the sidewalls and/or protrusions provided in the sidewalls of the receiving slot, and may further include pulling the cable outwardly from the receiving slot.

The process 500 may further include detaching the cable carrier from the point in the wire. Detaching the cable carrier from the point in the wire may include opening the cable carrier from the closed configuration to the opened configuration, and removing the cable carrier from the wire. Detaching the cable carrier from the point in the wire may occur while the cable is maintained within the receiving slot.

The detailed description of example implementations refers to the accompanying drawings. The same reference numbers in different drawings may identify the same or similar elements. In the following description, for the purpose of explanation, numerous specific details are set forth in order to provide an understanding of various implementations of the subject matter. It will be evident, however, to those skilled in the art, that implementations of the inventive subject matter may be practiced without these specific details. In general, well-known structures and techniques are not necessarily shown in detail.

It is understood that the examples and implementations described herein are for illustrative purposes and that various modifications or changes in light thereof will be suggested to persons skilled in the art and are to be included within the spirit and purview of this application and the scope of the appended claims.

Unless defined otherwise, all technical and scientific terms used herein have the same meaning as commonly understood by one of ordinary skill in the art to which this disclosure belongs. Although any methods and materials similar or equivalent to those described herein can be used in the practice or testing of the present disclosure, some potential and preferred methods and materials are now described.

As used herein "a cable", "electronics cable" or "Network cable" may refer to various cables used for transferring power and/or data signals from one end to another. For example a fiber cable which carries light and laser based signals. Conversely, a "wire" as used herein may refer to a non-electrical component, such as a metal wire, a rope, or similar device. While cables are often interchangeably referred to as "wires" in the art, this application is specifically drafted to have a wire acting as a structural feature rather than an cable for transferring power and/or data for purposes of clarity and to avoid unnecessary confusion.

It must be noted that as used herein and in the appended claims, the singular forms "a", "an", and "the" include plural referents unless the context clearly dictates otherwise. Although the terms "first", "second", etc. may be used herein to describe various elements, components, regions, layers and/or sections, it should be understood that they should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present disclosure.

What is claimed is:

1. A system for positioning various cables within a server room, comprising:
  a wire-pulley system comprising a wire operably coupled to a first pulley wheel and a second pulley wheel, wherein the wire is looped around the first and second pulley wheel such that a point in the wire is laterally movable between the first and second pulley wheels when the first and second pulley wheels are rotated; and
  a cable carrier, removably coupled to the point in the wire, the cable carrier comprising a first panel, and a second panel hingedly coupled to the first panel, wherein the first and second panels each comprise a plurality of receiving slots, wherein each of the plurality of receiving slots are configured to removably receive a distal end of various cables, wherein the first and second panels each comprise a distal edge, and each of the plurality of receiving slots comprise a distal opening at the respective distal edge, a closed proximal end, sidewalls therebetween, and an open top.

2. The system of claim 1, wherein the sidewalls define a first width of the receiving slot and a second width of the receiving slot, below the first width, wherein the second width is smaller than the first width, wherein the first and second widths are configured to correspond with respective widths of heads of a respective first type and second type of given cable connectors of various cables.

3. The system of claim 2, wherein the sidewalls define a third width, below the first width and the second width, wherein the third width is smaller than the first width and the second width, wherein the third width is configured to correspond with a width of a head of a third type of cable connector of various cables.

4. The system of claim 2, wherein the sidewalls comprise a pair of oppositely opposed protrusions extending into the receiving slot, wherein the protrusions are configured to provide frictional engagement with the head of the given cable connector to secure the head within the receiving slot.

5. The system of claim 1, wherein the cable carrier is movable between an opened and closed configuration, wherein in the opened configuration the first panel and second panel are substantially planar, such that the cable carrier forms a substantially linear shape, and wherein in the closed configuration, top surfaces of the first and second panels are in contact, such that the open tops of receiving slots of the first panel align with the open tops of the receiving slots of the second panel.

6. The system of claim 5, wherein the point in the wire is maintained between the first panel and the second panel in the closed configuration, such that friction between the first and second panel and the wire removably couples the cable carrier to the wire.

7. The system of claim 5, wherein the cable carrier further comprises an attachment device on a bottom surface of the first panel or the second panel, wherein the attachment device is configured to removably couple the cable carrier with the point in the wire.

8. The system of claim 1, wherein the cable carrier comprises twelve receiving slots, such that the cable carrier is configured to removably receive the distal ends of twelve cables.

9. A cable carrier for attachment of various cables for positioning the cables, comprising:
  a first panel, comprising a first plurality of receiving slots, configured to removably receive a plurality of cable connectors of cables, wherein each of the first plurality of receiving slots define a distal opening at a distal edge of the first panel, a closed proximal end at a proximal edge of the first panel, sidewalls therebetween, and an open top, wherein the sidewalls of the first plurality of receiving slots defines a first width configured to correspond with a width of a head of a first given cable connector of the cables; and
  a second panel, hingedly coupled with the proximal edge of first panel at a proximal edge of the second panel, the second panel comprising a second plurality of receiving slots, configured to removably receive a second plurality of cable connectors of cables, wherein each of the second plurality of receiving slots define a distal opening at a distal edge of the second panel, a closed proximal end at the proximal edge of the second panel, sidewalls therebetween, and an open top, wherein the sidewalls of the second plurality of receiving slots defines a second width configured to correspond with the width of the head of the first given cable connector of the cables.

10. The cable carrier of claim 9, wherein:
  the sidewalls of the first plurality of receiving slots define a third width, below the first width, wherein the third width is smaller than the first width, wherein the third width is configured to correspond with a width of a head of a second given cable connector of the cables; and
  the sidewalls of the second plurality of receiving slots define a fourth width, below the second width, wherein the fourth width is smaller than the second width, wherein the fourth width is configured to correspond with the width of the head of the second given cable connector of the cables.

11. The cable carrier of claim 10, wherein:
  the sidewalls of the first plurality of receiving slots comprise a first pair of oppositely opposed protrusions extending into the first width of the first plurality of receiving slots, wherein the first pair of protrusions are configured to provide frictional engagement with the head of the first given cable connector to secure the head within the receiving slot; and
  the sidewalls of the first plurality of receiving slots comprise a second pair of oppositely opposed protrusions extending into the third width of the first plurality of receiving slots, wherein the second pair of protrusions are configured to provide frictional engagement with the head of the first given cable connector to secure the head within the receiving slot.

12. The cable carrier of claim 11, wherein:
  the sidewalls of the second plurality of receiving slots comprise a third pair of oppositely opposed protrusions extending into the second width of the second plurality of receiving slots, wherein the third pair of protrusions are configured to provide frictional engagement with the head of the second given cable connector to secure the head within the receiving slot; and
  the sidewalls of the second plurality of receiving slots comprise a fourth pair of oppositely opposed protrusions extending into the fourth width of the second plurality of receiving slots, wherein the fourth pair of protrusions are configured to provide frictional engagement with the head of the second given cable connector to secure the head within the receiving slot.

13. The cable carrier of claim 10, wherein the cable carrier is movable between an opened and closed configuration, wherein in the opened configuration the first panel and second panel are substantially planar, such that the cable carrier forms a substantially linear shape, and wherein in the closed configuration, top surfaces of the first and second panels are in contact, such that the open tops of first plurality of receiving slots align with the open tops of the second plurality of receiving slots.

* * * * *